(12) United States Patent
Kurian et al.

(10) Patent No.: US 11,250,420 B2
(45) Date of Patent: *Feb. 15, 2022

(54) TRANSFERRING DATA USING A SMART RECONCILIATION SYSTEM

(71) Applicant: Bank of America Corporation, Charlotte, NC (US)

(72) Inventors: Manu Kurian, Dallas, TX (US); Paul Roscoe, Treuddyn Flintshire (GB); Jerzy Miernik, Allen, TX (US); Saritha Prasad Vrittamani, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/804,272

(22) Filed: Feb. 28, 2020

(65) Prior Publication Data

US 2020/0202339 A1 Jun. 25, 2020

Related U.S. Application Data

(63) Continuation of application No. 15/689,061, filed on Aug. 29, 2017, now Pat. No. 10,621,578.

(51) Int. Cl.
*G06F 7/00* (2006.01)
*G06F 17/00* (2019.01)
(Continued)

(52) U.S. Cl.
CPC .......... *G06Q 20/382* (2013.01); *G06Q 20/02* (2013.01); *G06Q 20/389* (2013.01);
(Continued)

(58) Field of Classification Search
None
See application file for complete search history.

(56) References Cited

U.S. PATENT DOCUMENTS 7,177,828 B1 2/2007 Land et al.
7,340,421 B1* 3/2008 Marcial .................. G06Q 40/02
705/30

(Continued)

OTHER PUBLICATIONS

Sep. 4, 2019 U.S. Non-Final Office Action—U.S. Appl. No. 15/689,061.
(Continued)

*Primary Examiner* — Tuan A Pham
(74) *Attorney, Agent, or Firm* — Banner & Witcoff, Ltd.

(57) ABSTRACT

Aspects of the disclosure relate to transferring data using a smart reconciliation system. A computing platform may receive, from a smart reconciliation node, a data file. Thereafter, the computing platform may retrieve, based on the data file, a data file profile indicating historical information associated with the data file. Then, the computing platform may determine an issue associated with the data file. Subsequently, the computing platform may identify, based on the issue associated with the data file, a data file level error indicating a level where the issue occurred. Next, the computing platform may generate, based on the data file level error, one or more commands directing the smart reconciliation node to execute an automated response for the issue associated with the data file. Then, the computing platform may transmit the one or more commands. Afterwards, the computing platform may update the data file profile.

20 Claims, 9 Drawing Sheets

(51) Int. Cl.
  *G06Q 20/38* (2012.01)
  *H04L 29/06* (2006.01)
  *G06Q 20/02* (2012.01)
  *G06Q 20/40* (2012.01)
(52) U.S. Cl.
  CPC ....... *G06Q 20/405* (2013.01); *G06Q 20/4016* (2013.01); *H04L 63/0428* (2013.01)

(56) References Cited

U.S. PATENT DOCUMENTS

| | | | |
|---|---|---|---|
| 7,536,325 B2 | 5/2009 | Randell et al. | |
| 7,539,634 B2 | 5/2009 | Goodbody et al. | |
| 2005/0044015 A1 | 2/2005 | Bracken et al. | |
| 2006/0287953 A1 | 12/2006 | Chauhan | |
| 2009/0076935 A1 | 3/2009 | Knowles et al. | |
| 2010/0241806 A1* | 9/2010 | Kawano | G06F 11/1441 711/118 |
| 2012/0311684 A1* | 12/2012 | Paulsen | G06F 21/44 726/6 |
| 2016/0266939 A1 | 9/2016 | Shear et al. | |
| 2016/0281607 A1 | 9/2016 | Asati et al. | |
| 2016/0300235 A1 | 10/2016 | Boyle et al. | |
| 2016/0321661 A1 | 11/2016 | Hammond et al. | |
| 2016/0323279 A1 | 11/2016 | Raleigh | |
| 2016/0323732 A1 | 11/2016 | Raleigh | |
| 2016/0323771 A1 | 11/2016 | Raleigh | |
| 2016/0330567 A1 | 11/2016 | Raleigh | |
| 2016/0335633 A1 | 11/2016 | Joyce et al. | |
| 2016/0337799 A1 | 11/2016 | Johnson | |
| 2016/0337883 A1 | 11/2016 | Raleigh et al. | |
| 2016/0342992 A1 | 11/2016 | Lee | |
| 2016/0344604 A1 | 11/2016 | Raleigh et al. | |
| 2016/0359665 A1 | 12/2016 | Raleigh | |
| 2016/0359872 A1 | 12/2016 | Yadav et al. | |
| 2016/0373588 A1 | 12/2016 | Raleigh et al. | |
| 2017/0006010 A1 | 1/2017 | Miu | |
| 2017/0019970 A1 | 1/2017 | Chemel et al. | |
| 2017/0061430 A1 | 3/2017 | Matthews et al. | |
| 2017/0078922 A1 | 3/2017 | Raleigh et al. | |
| 2017/0083845 A1 | 3/2017 | Karcher et al. | |
| 2017/0086279 A1 | 3/2017 | Chemel et al. | |
| 2017/0116403 A1 | 4/2017 | Bouse et al. | |
| 2017/0124296 A1 | 5/2017 | Baldwin et al. | |
| 2017/0124297 A1 | 5/2017 | Baldwin et al. | |
| 2017/0124298 A1 | 5/2017 | Baldwin et al. | |
| 2017/0124299 A1 | 5/2017 | Baldwin et al. | |
| 2017/0124300 A1 | 5/2017 | Baldwin et al. | |
| 2017/0124301 A1 | 5/2017 | Baldwin et al. | |
| 2017/0124302 A1 | 5/2017 | Baldwin et al. | |
| 2017/0124303 A1 | 5/2017 | Baldwin et al. | |
| 2017/0134435 A1 | 5/2017 | Kling et al. | |
| 2017/0168566 A1 | 6/2017 | Osterhout et al. | |
| 2017/0201850 A1 | 7/2017 | Raleigh et al. | |
| 2017/0206529 A1 | 7/2017 | Raleigh | |
| 2017/0208459 A1 | 7/2017 | Raleigh et al. | |
| 2017/0213005 A1 | 7/2017 | Cox et al. | |
| 2017/0215073 A1 | 7/2017 | Raleigh | |
| 2017/0220757 A1 | 8/2017 | Cox et al. | |
| 2017/0220758 A1 | 8/2017 | Cox et al. | |
| 2017/0223516 A1 | 8/2017 | Raleigh | |
| 2017/0235786 A9 | 8/2017 | Faith et al. | |
| 2017/0235848 A1 | 8/2017 | Van Dusen et al. | |
| 2017/0235885 A1 | 8/2017 | Cox | |
| 2017/0235886 A1 | 8/2017 | Cox et al. | |
| 2017/0235893 A1 | 8/2017 | Cox et al. | |
| 2017/0235894 A1 | 8/2017 | Cox et al. | |
| 2017/0235895 A1 | 8/2017 | Cox | |
| 2017/0235906 A1 | 8/2017 | Dorris et al. | |
| 2017/0236063 A1 | 8/2017 | Dorris et al. | |

OTHER PUBLICATIONS

Jan. 15, 2020 U.S. Notice of Allownace and Fees Due—U.S. Appl. No. 15/689,061.

\* cited by examiner

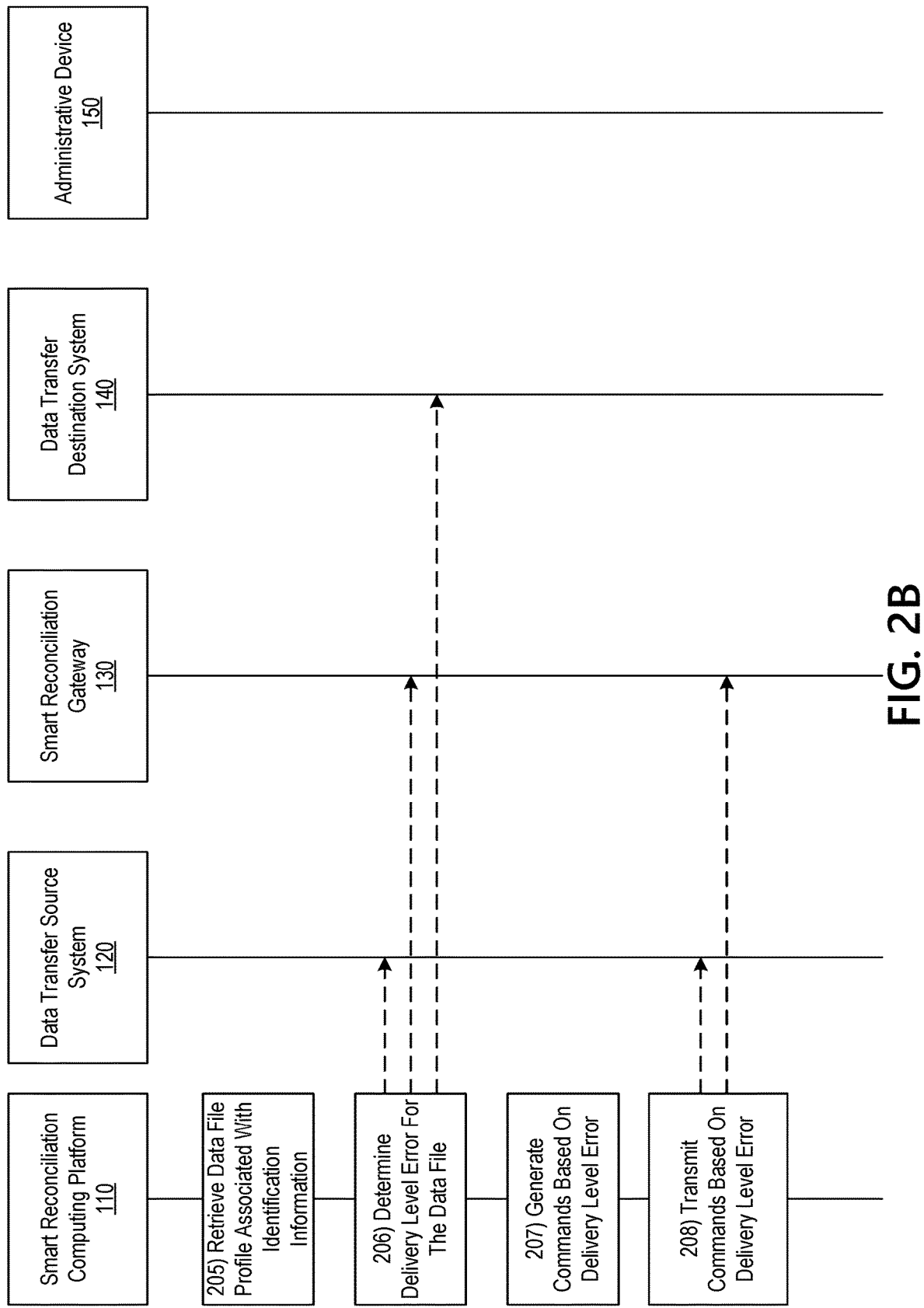

TRANSFERRING DATA USING A SMART RECONCILIATION SYSTEM

CROSS-REFERENCE TO RELATED APPLICATIONS

This application claims the benefit of and is a continuation of U.S. patent application Ser. No. 15/689,061, filed Aug. 29, 2017, and entitled "Transferring Data Using A Smart Reconciliation System," which is incorporated by reference herein in its entirety.

BACKGROUND

Aspects of the disclosure relate to electrical computers, digital processing systems, and multicomputer data transferring. In particular, one or more aspects of the disclosure relate to transferring data using a smart reconciliation system.

In some instances, systems of an enterprise organization may transfer data files to other systems of the enterprise organization. For example, each system may be assigned a particular task for the enterprise organization. After completing the task, the system may transfer a data file to another system within the enterprise organization. However, transferred data files may contain errors. For instance, the data files may be corrupt and/or incomplete. Based on an incomplete and/or corrupt data file, the receiving system may have difficulty completing their assigned task.

SUMMARY

Aspects of the disclosure provide effective, efficient, scalable, and convenient technical solutions that address and overcome the technical problems associated with transferring data using a smart reconciliation system.

In accordance with one or more embodiments, a computing platform having at least one processor, a memory, and a communication interface may receive, by the at least one processor, via the communication interface, and from a smart reconciliation node, a data file. Thereafter, the computing platform may retrieve, based on the data file, a data file profile indicating historical information associated with the data file. Then, the computing platform may determine, based on comparing the data file profile with the data file, an issue associated with the data file. Subsequently, the computing platform may identify, based on the issue associated with the data file, a data file level error indicating a level where the issue occurred. Next, the computing platform may generate, based on the data file level error, one or more commands directing the smart reconciliation node to execute an automated response for the issue associated with the data file. Then, the computing platform may transmit, to the smart reconciliation node via the communication interface, the one or more commands directing the smart reconciliation node to execute the automated response for the issue associated with the data file. Afterwards, the computing platform may update, based on the automated response for the issue and the data file, the data file profile.

In some embodiments, the computing platform may identify, based on the data file, a route associated with the data file, wherein the route indicates a first system that transmits the data file and a second system that receives the data file. In some embodiments, the smart reconciliation node may intercept the data file in transit from the first system to the second system. In some embodiments, the historical information associated with the data file may comprise previous times of day that the data file was received, a number of parts associated with the data file, or one or more priorities associated with the data file.

In some embodiments, in determining the issue associated with the data file, the computing platform may determine an error in delivering the data file, and wherein the identifying the data file level error comprises identifying a delivery level error. In some embodiments, the one or more commands directing the smart reconciliation node to execute the automated response for the issue associated with the data file may comprise causing, based on the data file level error, a first system to redeliver the data file to a second system.

In some embodiments, the computing platform may identify, based on the data file, a plurality of sections within the data file. Subsequently, in determining the issue associated with the data file, the computing platform may determine, based on comparing the data file profile with the plurality of sections within the data file, a missing section of the data file. After, in identifying the data file level error, the computing platform may identify a content level error.

In some embodiments, the computing platform may determine, based on the data file profile and the missing section of the data file, content associated with the missing section of the data file. Subsequently, the one or more commands directing the smart reconciliation node to execute an automated response for the issue associated with the data file may comprise inserting the content associated with the missing section of the data file in the data file. In some embodiments, the one or more commands directing the smart reconciliation node to execute an automated response for the issue associated with the data file may comprise causing, based on the content level error, a first system to deliver content associated with the missing section of the data file to a second system.

In some embodiments, in the determining the issue associated with the data file, the computing platform may determine an error in a value of the data file based on comparing the historical information associated with the data file with the data file, and wherein the identifying the data file level error comprises identifying a value level error. In some embodiments, the one or more commands directing the smart reconciliation node to execute an automated response for the issue associated with the data file may comprise replacing the value of the data file associated with the value level error with a corrected value.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for transferring data using a smart reconciliation system in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
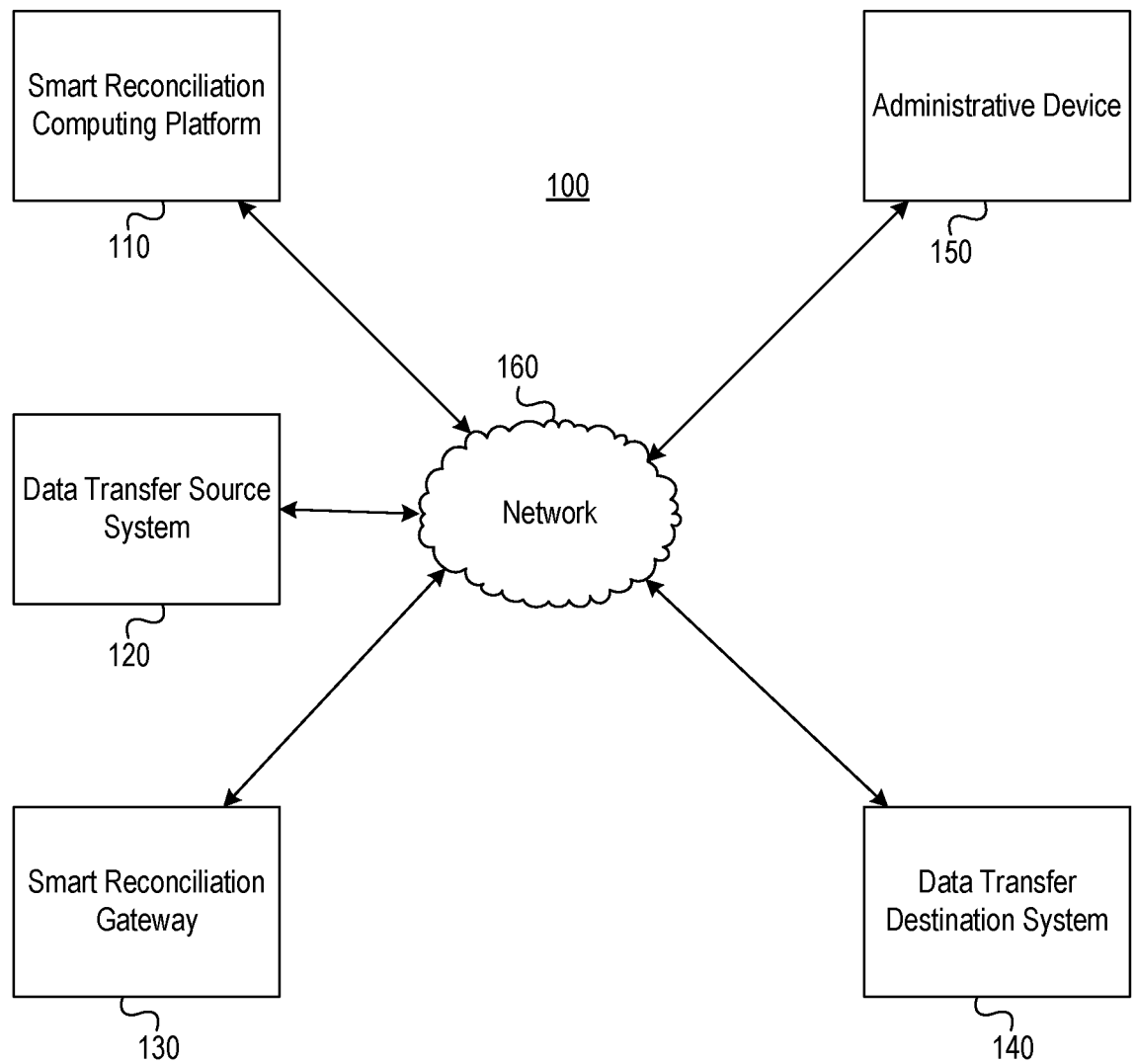
FIGS. 1A and 1B depict an illustrative computing environment for transferring data using a smart reconciliation system in accordance with one or more example embodiments.
Figure 1B:
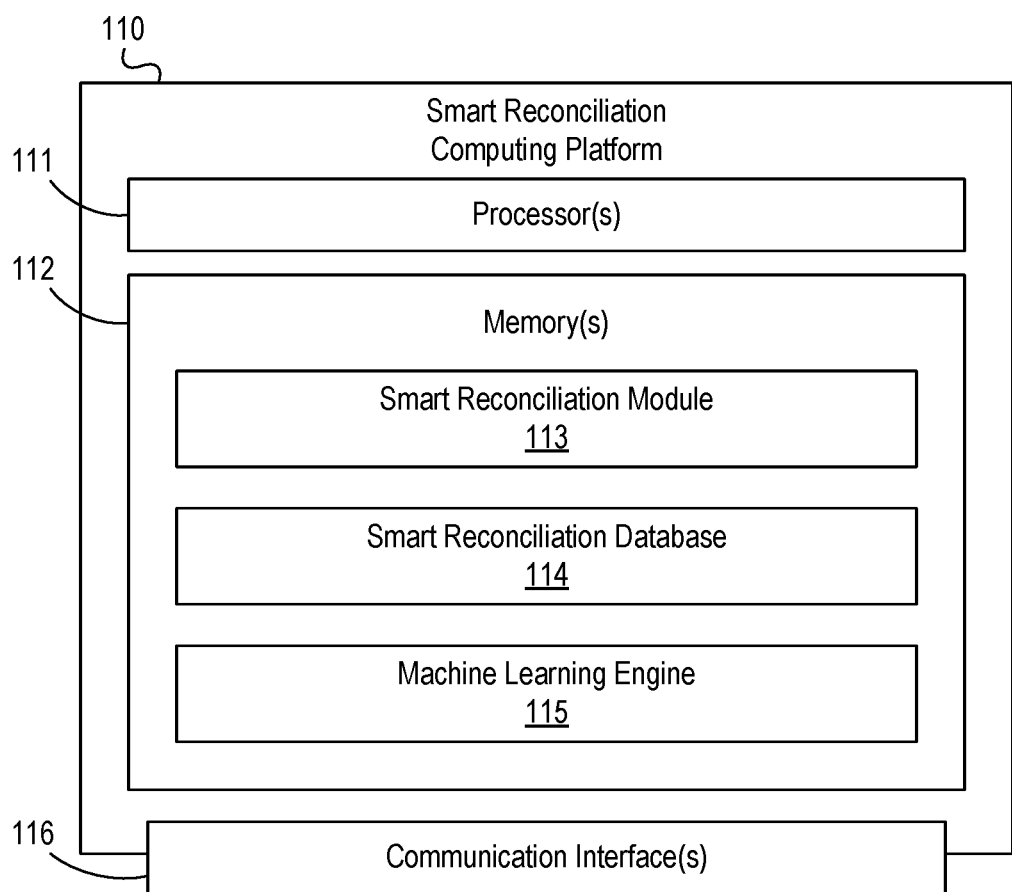

FIGS. 1A and 1B depict an illustrative computing environment for transferring data using a smart reconciliation system in accordance with one or more example embodiments. Referring to FIG. 1A, computing environment 100 may include one or more computing devices and/or other computer systems. For example, computing environment 100 may include a smart reconciliation computing platform 110, a data transfer source system 120, a smart reconciliation gateway 130, a data transfer destination system 140, and an administrative device 150.

Smart reconciliation computing platform 110 may be configured to monitor and/or control data transfers between systems by controlling and/or directing actions of other devices and/or computer systems, and/or may be configured to perform other functions, as discussed in greater detail below. In some instances, smart reconciliation computing platform 110 may perform and/or provide one or more techniques to monitor data transfers between systems.

Data transfer source system 120 may be configured to receive and/or transmit data files for the enterprise organization. For example, the data transfer source system 120 may be configured to perform one or more functions and/or tasks for the enterprise organization. A task may include multiple parts, and each part may be performed by a different system. For instance, after completing a part of the task, the data transfer source system 120 may transfer one or more data files to another system, such as the data transfer destination system 140. The data transfer destination system 140 may receive and use the one or more data files to complete another part of the task. In some embodiments, the roles of the data transfer source system 120 and the data transfer destination system 140 may be reversed. For example, after the data transfer destination system 140 completes a part of the task, the data transfer destination system 140 may transfer one or more data files to the data transfer source system 120. Then, the data transfer source system 120 may receive and use the one or more data files to complete another part of the task.

While computing environment 100 is illustrated as including a data transfer source system 120 and a data transfer destination system 140, computing environment 100 may, in some instances, include a plurality of different systems that may perform a plurality of different tasks for the enterprise organization. Thus, each system (e.g., data transfer source system 120 and/or data transfer destination system 140) may transmit and/or receive one or more data files while completing their assigned tasks.

Smart reconciliation gateway 130 may be configured to receive, intercept, and/or transmit data files that are transferred between multiple different systems. For example, the smart reconciliation gateway 130 may be configured to receive, intercept and/or analyze data file transfers from one or more systems of the enterprise organization (e.g., data transfer source system 120 and/or data transfer destination system 140). After receiving and/or intercepting the data files, the smart reconciliation gateway 130 may transmit the data files to the smart reconciliation computing platform 110. Additionally, and/or alternatively, the smart reconciliation gateway 130 may be connected to one or more systems of the enterprise organization. For example, the smart reconciliation gateway 130 may be a node that is connected to a system, such as the data transfer source system 120. After the data transfer source system 120 transfers a data file, the smart reconciliation gateway 130 may intercept the data file. Then, the smart reconciliation gateway 130 may transfer the data file to the smart reconciliation computing platform 110. In some examples, after the smart reconciliation computing platform 110 analyzes the data file, the smart reconciliation gateway 130 may receive requests for information, transmit requested information, receive commands, execute the commands, and/or perform other functions, as discussed in greater detail below. In some instances, the smart reconciliation gateway 130 might not be another entity, and the functionalities of the smart reconciliation gateway 130 may be included within the smart reconciliation computing platform 110.

Data transfer destination system 140 may be configured to receive and/or perform one or more functions and/or tasks for the enterprise organization. For example, as mentioned above, after completing a part of the task, the data transfer source system 120 may transfer one or more data files to another system, such as the data transfer destination system 140. The data transfer destination system 140 may receive and use the one or more data files to complete another part of the task. In some embodiments, the smart reconciliation gateway 130 may intercept the data file from the data transfer source system 120. For example, as explained below, the data file may include one or more errors within the data file. The smart reconciliation gateway 130 may intercept the data file and transmit the data file to the smart reconciliation computing platform 110 for analysis. After analyzing the data file and/or determining one or more errors within the data file, the smart reconciliation computing platform 110 may transmit one or more commands to execute an automated response for the data file. The smart reconciliation gateway 130 may execute the automated response to fix the errors in the data file. Then, the smart reconciliation gateway 130 may transmit the fixed data file to the data transfer destination system 140.

Administrative device 150 may be configured to be used by one or more administrators of computing environment 100. For example, the administrative device 150 may be configured to display, present, and/or otherwise provide one or more user interfaces that enable the one or more administrators to monitor one or more tasks performed by a system of the enterprise organization. The administrative device 150 may receive, from the one or more administrators, user input or selections and send the user input or selections to the smart reconciliation computing platform 110 and/or one or more other computer systems and/or devices in computing environment 100. The administrative device 150 may receive, from the smart reconciliation computing platform 110 and/or one or more other computer systems and/or devices in computing environment 100, information or data in response to the user input or selection.

In one or more arrangements, data transfer source system 120, smart reconciliation gateway 130, data transfer destination system 140, and administrative device 150 may be any type of computing device capable of providing a user interface, receiving input via the user interface, and communicating the received input to one or more other computing devices. For example, data transfer source system 120, smart reconciliation gateway 130, data transfer destination system 140, and administrative device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data transfer source system 120, smart reconciliation gateway 130, data transfer destination system 140, and administrative device 150 may, in some instances, be special-purpose computing devices configured to perform specific functions.

Computing environment 100 also may include one or more computing platforms. For example, and as noted above, computing environment 100 may include smart reconciliation computing platform 110. As illustrated in greater detail below, the smart reconciliation computing platform 110 may include one or more computing devices configured to perform one or more of the functions described herein. For example, the smart reconciliation computing platform 110 may include one or more computers (e.g., laptop computers, desktop computers, servers, server blades, or the like).

Computing environment 100 also may include one or more networks, which may interconnect one or more of data transfer source system 120, smart reconciliation gateway 130, data transfer destination system 140, and administrative device 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, smart reconciliation computing platform 110, data transfer source system 120, smart reconciliation gateway 130, data transfer destination system 140, and administrative device 150 may be associated with an organization, and a private sub-network included in network 160 and associated with and/or operated by the organization may include one or more networks (e.g., LANs, WANs, virtual private networks (VPNs), or the like) that interconnect smart reconciliation computing platform 110, data transfer source system 120, smart reconciliation gateway 130, data transfer destination system 140, and administrative device 150. Network 160 also may include a public sub-network that may connect the private sub-network and/or one or more computing devices connected thereto (e.g., smart reconciliation computing platform 110, data transfer source system 120, smart reconciliation gateway 130, data transfer destination system 140, and administrative device 150) with one or more networks and/or computing devices that are not associated with the organization.

Referring to FIG. 1B, smart reconciliation computing platform 110 may include one or more processors 111, memory 112, and communication interface 116. A data bus may interconnect processor(s) 111, memory 112, and communication interface 116. Communication interface 116 may be a network interface configured to support communication between smart reconciliation computing platform 110 and one or more networks (e.g., network 160). Memory 112 may include one or more program modules having instructions that when executed by processor(s) 111 cause the smart reconciliation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the smart reconciliation computing platform 110 and/or by different computing devices that may form and/or otherwise make up the smart reconciliation computing platform 110. For example, memory 112 may have, store, and/or include a smart reconciliation module 113, a smart reconciliation database 114, and a machine learning engine 115. Smart reconciliation module 113 may have instructions that direct and/or cause smart reconciliation computing platform 110 to analyze data transfers between systems, as discussed in greater detail below. Smart reconciliation database 114 may store information used by the smart reconciliation module 113 and/or the smart reconciliation computing platform 110 in analyzing data transfers between systems and/or in performing other functions. Machine learning engine 115 may have instructions that direct and/or cause the smart reconciliation computing platform 110 to set, define, and/or iteratively redefine optimization rules, techniques and/or other parameters used by smart reconciliation computing platform 110 and/or other systems in computing environment 100.

Figure 2A:
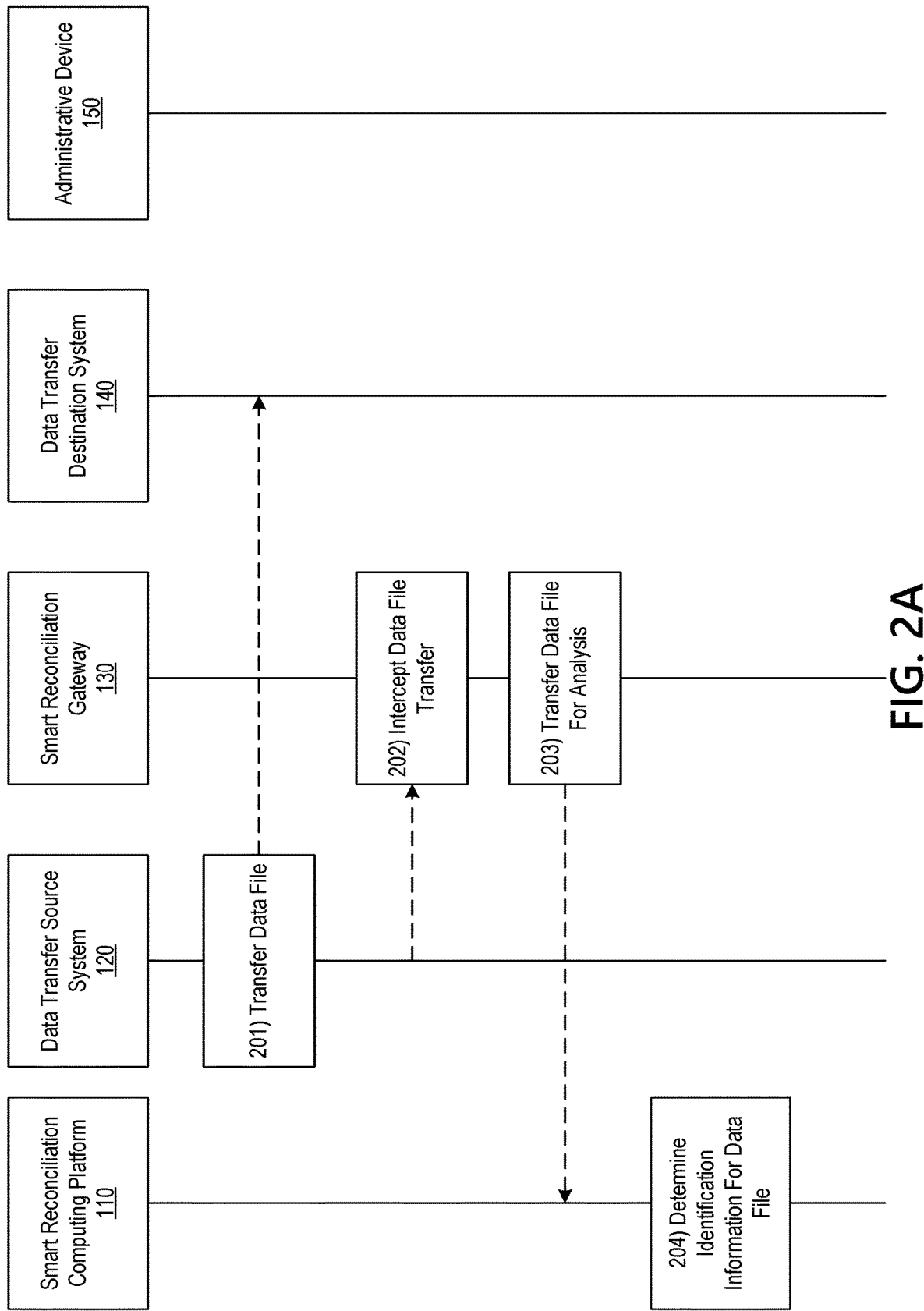

FIGS. 2A, 2B, 2C, 2D, and 2E depict an illustrative event sequence for transferring data using a smart reconciliation system in accordance with one or more example embodiments. Referring to FIG. 2A, at step 201, the data transfer source system 120 may transmit one or more data files to another system, such as the data transfer destination system 140. For example, the data transfer source system 120 may perform one or more assigned tasks for the enterprise organization. Each task may include a multitude of different steps, and one of the steps may include transferring a data file to another system, such as a data transfer destination system 140. At step 201, the data transfer source system 120 may perform a step of the task by transmitting the data file to the data transfer destination system 140.

At step 202, smart reconciliation gateway 130 may intercept the data file transfer. For example, the smart reconciliation gateway 130 may be connected, attached, and/or in communication with the data transfer source system 120. When the data transfer source system 120 transmits one or more data files, the smart reconciliation gateway 130 may intercept the data file transfer. Then, the smart reconciliation gateway 130 may analyze the data file for errors. In some instances, the data file may include one or more errors, including errors that may crash the data transfer source system 120 and/or the data transfer destination system 140. Thus, prior to the data transfer destination system 140 receiving the data file, the smart reconciliation gateway 130 may intercept the data file. In some embodiments, the data transfer source system 120 may transmit the data file directly to the smart reconciliation gateway 130.

In some examples, a plurality of smart reconciliation gateways 130 may be connected to a plurality of different systems within the enterprise organization. Each smart reconciliation gateway 130 may intercept and/or receive data file transfers for one or more systems within the enterprise organization. Further, in some instances, the smart reconciliation gateway 130 may be a portable computing device and/or a node that may be connected to a system of the enterprise organization (e.g., data transfer source system 120). In such instances, the smart reconciliation gateway 130 may be plugged in or attached to the system. After plugging in or attaching to the system, the smart reconciliation gateway 130 may intercept communications (e.g., data file transfers) between the attached system and one or more other systems in the enterprise organization.

At step 203, smart reconciliation gateway 130 may transfer the data file for analysis. For example, the smart reconciliation gateway 130 may transfer the data file to the smart reconciliation computing platform 110. At step 204, after the smart reconciliation computing platform 110 receives the transferred data file, the smart reconciliation computing platform 110 may determine identification information associated with the data file. The identification information may correspond to characteristics and/or properties of the data file, such as, but not limited to, the time of day the data file is transferred, the number of sections, parts, lines, transactions, and/or files in the data file, the systems transmitting and receiving the data files, and/or other attributes associated with the data file.

In some examples, the smart reconciliation computing platform 110 may determine identification information corresponding to a particular data file, such as a data file identifier and/or a unique data file profile. Additionally, and/or alternatively, the smart reconciliation computing platform 110 may determine identification information corresponding to the system transferring the data file (e.g., the data transfer source system 120), the system receiving the data file (e.g., the data transfer destination system 140), and/or the task being performed by the systems (e.g., the task being performed by the data transfer source system 120 and the data transfer destination system 140).

In some embodiments, the data file may include and/or otherwise be associated with inlay data. Inlay data may correspond to multiple inherent account transactions that are interdependent. An account transaction may be a transaction of currency between different accounts. For example, a user account may be associated with multiple interdependent transactions for a project, such as a project to remodel a kitchen. The inlay data may include multiple interconnected transactions, such as purchasing the countertop, flooring, and/or sink. However, the inlay data might not include a transaction indicating hiring a contractor and/or purchasing a refrigerator. The data transfer source system 120 may receive the transactions from a user device and may further organize them into a data file. Then, the data transfer source system 120 may transfer the data file to the data transfer destination system 140. The data transfer destination system 140 may authorize payments for the multiple transactions. However, prior to the data transfer destination system 140 receiving the data file, at step 203, the smart reconciliation gateway 130 may intercept and transfer the data file to the smart reconciliation computing platform 110. At step 204, the smart reconciliation computing platform 110 may determine identification information associated with the data file, such as the identification information for data file may indicate transactions for a project. Then, in the steps described below, the smart reconciliation computing platform 110 may determine the missing transactions (e.g., hiring a contractor) for the project and generate one or more commands to execute an automated reconciliation response for the missing transaction.

In some examples, the data file may include and/or otherwise be associated with outlay data. Outlay data may correspond to a pattern of transactions associated with an account. For example, a user account may perform a number of transactions over a period of time, such as fifty account transactions each day. The data transfer source system 120 may receive the transactions from a user device and may further organize them into a data file. Then, the data transfer source system 120 may transfer the data file to the data transfer destination system 140. The data transfer destination system 140 may authorize payments for the multiple transactions. However, prior to the data transfer destination system 140 receiving the data file and authorizing the transactions, at step 203, the smart reconciliation gateway 130 may intercept and transfer the data file to the smart reconciliation computing platform 110. At step 204, the smart reconciliation computing platform 110 may determine identification information associated with the data file, such as the user account associated with the data file. Then, in the steps described below, the smart reconciliation computing platform 110 may determine missing and/or unauthorized transactions and generate one or more commands to execute an automated response for the data file.

Referring to FIG. 2B, at step 205, smart reconciliation computing platform 110 may retrieve, from the smart reconciliation database 114, a data file profile associated with the identification information determined at step 204. For example, based on similar characteristics, properties, systems (e.g., data transfer source system 120 and/or data transfer destination system 140), identifiers, and/or other identification information described at step 204, the smart reconciliation computing platform 110 may retrieve a data file profile associated with the data file. The data file profile may include similar characteristics, properties, attributes, and/or profiles associated with previously received data files. For example, the smart reconciliation computing platform 110 may identify transactions indicating a particular project. The smart reconciliation computing platform 110 may determine characteristics, properties, attributes, and/or profiles associated with previous data files indicating the particular project. Additionally, and/or alternatively, the smart reconciliation computing platform 110 may identify a data file profile that matches the previous data file. For instance, the identification information may identify a user account. The smart reconciliation computing platform 110 may retrieve previous data files associated with the user account.

In some instances, the data file profile may indicate previous historical information for the previous data files. The previous historical information may correspond to a data file size, content (e.g., transactions) associated with the previous data files, a time the previous data files were transmitted and/or received, parts of the previous data file (e.g., different sections, transactions, and/or topics), and/or priorities for different parts of the previous data file. For example, the previous historical information may indicate a time of the day, such as 5 PM ET, that previous data files associated with the user account were transmitted and/or received. Additionally, and/or alternatively, the previous historical information may indicate different parts (e.g., fifty transactions) and/or priorities (e.g., different priorities for each of the fifty transactions) for the previous data files. Further, in some examples, the priorities associated with different parts of the data file may correspond to a data file classification. The data file classification may correspond to a classification of different parts, sections, and/or transactions for the data file (e.g., private, public, and/or confidential).

At step 206, smart reconciliation computing platform 110 may determine a delivery level error for the data file. For example, smart reconciliation computing platform 110 may determine, based on the data file profile characteristics, a level error for the data file. A level error may indicate a delivery level error, a content level error, and/or a value level error. The delivery level error may indicate an error in delivery of the data file. In some instances, the smart reconciliation computing platform 110 may determine a delivery level error by comparing the data file with the data file profile characteristics. For example, by comparing the data file with the data file profile characteristics, the smart reconciliation computing platform 110 may determine that the data file's data transfer source system 120 and/or data transfer destination system 140 are different than previous data files' source system and/or destination system. For instance, the data transfer source system 120 may transmit the data file to an incorrect data transfer destination system 140. The smart reconciliation computing platform 110 may determine a delivery level error (e.g., an error indicating an incorrect data transfer destination system 140).

In some examples, the data file profile characteristics may indicate a time of the day (e.g., 5 PM) that the smart reconciliation computing platform 110 has previously data files with similar characteristics and/or from the same user account. For example, the smart reconciliation computing platform 110 may determine, from the data file profile characteristics, that previous data files were received at 5 PM ET. The smart reconciliation computing platform 110 might not receive a data file at 5 PM ET and may determine a delivery level error for the data file has occurred. Additionally, and/or alternatively, the smart reconciliation computing platform 110 may determine a time range (e.g., plus or minus five minutes) to delay prior to determining the delivery level error for the data file. For example, the data file may be delayed due to network traffic, and the smart reconciliation computing platform 110 may delay assigning a delivery level error to the data file until after the time range.

At step 207, smart reconciliation computing platform 110 may generate one or more commands based on the delivery level error. For example, the smart reconciliation computing platform 110 may generate, based on the delivery level error, one or more commands directing a computing device (e.g., the data transfer source system 120 and/or the smart reconciliation gateway 130) to execute an automated reconciliation response for the delivery level error. In some examples, the automated reconciliation response for the delivery level error may be for the data transfer source system 120 to transmit and/or re-transmit the data file to the data transfer destination system 140. For instance, the data transfer source system 120 may have transmitted the data file to an incorrect data transfer destination system 140. The smart reconciliation computing platform 110 may generate one or more commands directing the data transfer source system 120 to transmit the data file to the correct data transfer destination system 140. Additionally, and/or alternatively, the smart reconciliation computing platform 110 may generate one or more commands directing the incorrect data transfer destination system 140 to delete the data file. For example, the data file may include private and/or confidential information (e.g., determined from the data classification). The smart reconciliation computing platform 110 may generate one or more commands directing the incorrect data transfer destination system 140 to delete the private and/or confidential information.

In some examples, the data transfer source system 120 might not have transferred the data file within the determined time range. For example, the data transfer source system 120 and/or the smart reconciliation gateway might not have transferred the data file due to network errors. As such, the smart reconciliation computing platform 110 may generate one or more commands for the data transfer source system 120 to transmit and/or re-transmit the data file to the data transfer destination system 140. The smart reconciliation gateway 130 may continue to monitor the transfer and/or re-transfer of the data file from the data transfer source system 120 to the data transfer destination system 140. In some embodiments, the data transfer source system 120 and/or the smart reconciliation gateway 130 may have crashed. Thus, the data transfer source system 120 might not be able to transmit and/or re-transmit the data file to the data transfer destination system 140. In such embodiments, the smart reconciliation computing platform 110 may transmit feedback to an administrative device 150. The feedback may indicate that the data transfer source system 120 and/or the smart reconciliation gateway 130 may have crashed.

At step 208, the smart reconciliation computing platform 110 may transmit the one or more generated commands based on the delivery level error. For example, after generating the one or more commands at step 207, the smart reconciliation computing platform 110 may transmit the one or more generated commands to the data transfer source system 120 and/or the smart reconciliation gateway 130. In some instances, the data transfer source system 120 may receive and/or execute the one or more commands (e.g., transfer and/or re-transfer the data file to the data transfer destination system 140). Additionally, and/or alternatively, the smart reconciliation gateway 130 may receive the one or more generated commands. In some examples, the smart reconciliation gateway 130 may forward the one or more generated commands to the data transfer source system 120. Further, in some embodiments, the smart reconciliation gateway 130 may have intercepted the data file at step 202. And, at step 208, based on the one or more generated commands, the smart reconciliation gateway 130 may transmit or forward the data file to the correct data transfer destination system 140.

Figure 2C:
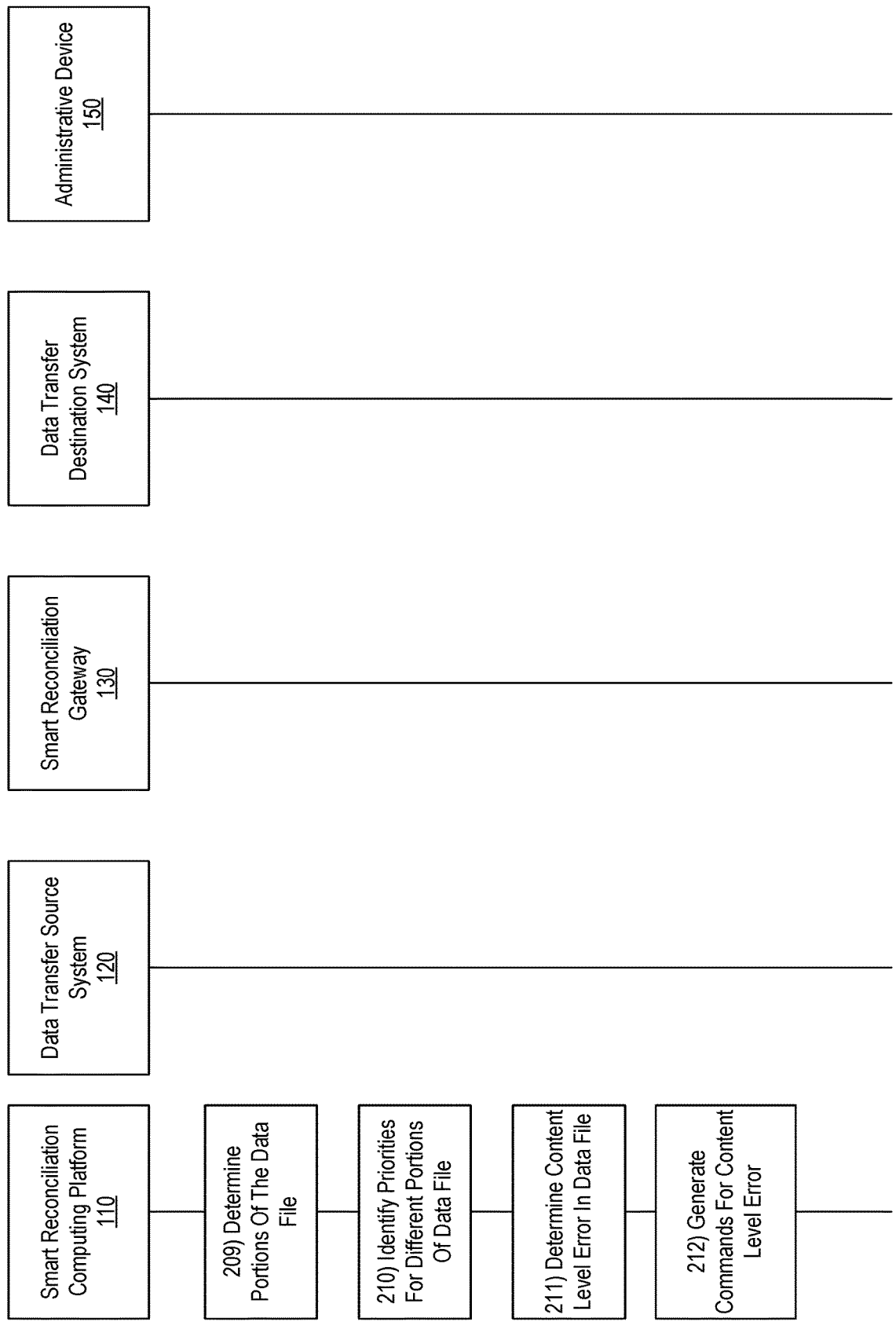
Figure 3:
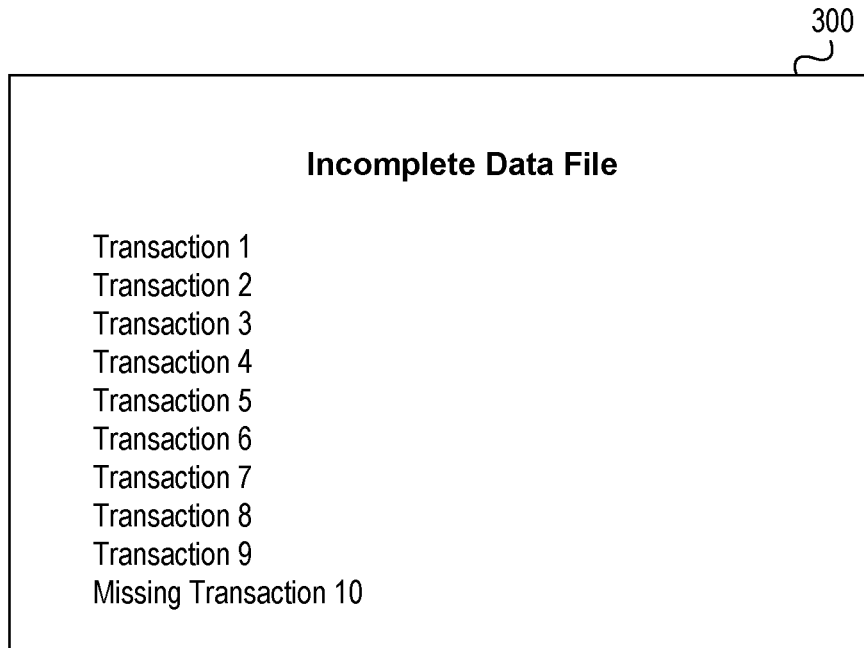
FIGS. 3 and 4 depict example graphical user interfaces for transferring data using a smart reconciliation system in accordance with one or more example embodiments.

Referring to FIG. 2C, at step 209, the smart reconciliation computing platform 110 may determine portions of the data file. For example, at step 209, the smart reconciliation computing platform may determine, based on the data file profile characteristics and/or the data file, one or more different portions, parts, sections, and/or transactions of the data file. FIG. 3 illustrates a graphical user interface that may be presented by a computing device to display the one or more portions of the data file. For instance, as seen in FIG. 3, graphical user interface 300 may include one or more fields, controls, and/or other elements that may allow a user (e.g., an administrator) to view an incomplete data file. For example, the graphical user interface 300 may allow a user (e.g., an administrator) to view a data file transmitted by the data transfer source system 120 and intercepted by the smart reconciliation gateway 130. As shown in FIG. 3, the graphical user interface 300 may display portions, lines, and/or transactions of the data file. In FIG. 3, nine different lines or transactions may be displayed. Each of these lines or transactions may be associated with a transaction for a user account. Further, the tenth transaction (e.g., "Missing Transaction 10") may be a missing transaction from the data file.

For example, the smart reconciliation computing platform 110 may determine that previous data files included ten transactions, but the current data file may only include nine transactions. The tenth transaction may be a "missing transaction." Additionally, and/or alternatively, rather than determining lines and/or transactions for the data file, the smart reconciliation computing platform 110 may determine portions and/or parts of the data file. For example, the parts and/or portions of the data file may include one or more transactions from FIG. 3.

While FIG. 3 displays data files comprising transactions, in some embodiments, the smart reconciliation computing platform 110 may determine parts and/or portions of a data file that might not include transactions. For example, a data file may include any information corresponding to an enterprise organization. And, at step 209, the smart reconciliation computing platform 110 may determine, based on the data file profile characteristics, one or more different parts and/or portions of the data file. For instance, the data file may include standard reporting and/or other routine maintenance information corresponding to the enterprise organization. The data profile characteristics may indicate previous reporting and/or maintenance information corresponding to data file. At step 209, the smart reconciliation computing platform 110 may determine, based on the previous reporting and/or maintenance information, one or more different parts and/or portions of the data file.

At step 210, smart reconciliation computing platform 110 may identify priorities for different portions of the data file. For example, after determining the portions of the data file, the smart reconciliation computing platform 110 may identify different priorities for each of the different portions of the data file based on the data file profile. In some instances, referring back to FIG. 3, the data file profile may indicate that particular transactions are associated with higher priorities than other transactions. For instance, the priorities of the transactions may be based on the vendor associated with the transaction, the monetary value associated with the transaction, and/or other factors assigned by the enterprise organization. Based on the assigned priorities, the smart reconciliation computing platform 110 may associate one or more transactions with one or more priorities. Further, in some examples, the smart reconciliation computing platform 110 may determine portions and/or parts of the data file. Then, the smart reconciliation computing platform 110 may identify different priorities for the different portions and/or parts of the data file. In some embodiments, the priorities may indicate data classifications, such as private, public, and/or confidential information. The smart reconciliation computing platform 110 may associate the different portions, parts, and/or transactions of the data file with different data classifications. For example, referring back to FIG. 3, "transaction 1" may be a public transaction, whereas "transaction 2" and transaction 3" may be confidential transactions.

At step 211, the smart reconciliation computing platform 110 may determine a content level error in the data file. For example, based on comparing the data file with the data file profile, the smart reconciliation computing platform 110 may determine a content level error. The content level error may indicate that the data file may be missing a portion, part, and/or transaction from the data file. For instance, referring to FIG. 3, after determining a transaction, such as "Missing Transaction 10," is missing from the data file, the smart reconciliation computing platform 110 may flag a content level error for the data file.

In some instances, the data file profile may indicate a number of previous transactions and/or parts associated with previous data files. For instance, the user account may indicate a plurality of previous data files transmitted by the data transfer source system 120. Each of the previous data files may indicate a number of transactions, such as ten transactions. After determining the transactions and/or parts of the data file at step 209, the smart reconciliation computing platform 110 may compare the different transactions and/or parts of previous data files with the current data file. Based on the comparison, the smart reconciliation computing platform 110 may determine one or more missing transactions and/or parts of the current data file.

In some examples, the smart reconciliation computing platform 110 may determine that the current data file corresponds to a data file profile indicating a plurality of interdependent transactions. The smart reconciliation computing platform 110 may retrieve a data file profile indicating previous data files for similar interdependent transactions (e.g., another set of data files indicating the project) associated with the current data file. The smart reconciliation computing platform 110 may then analyze and determine similar transactions, parts, and/or sections for the previous data files. After, the smart reconciliation computing platform 110 may compare the transactions, parts, and/or sections for the previous data files with the transactions, parts, and/or sections for the current data file. Based on the comparison, the smart reconciliation computing platform 110 may determine missing and/or additional transactions, parts, and/or sections in the current data file. For example, the current data file may be missing one or more of the interdependent transactions. At step 211, the smart reconciliation computing platform 110 may determine the missing parts and/or transactions from the current data file and may flag a content level error for the data file. Additionally, and/or alternatively, the smart reconciliation computing platform 110 may determine that the current data file includes one or more additional transactions that might not be associated with the interdependent transactions from the previous data files (e.g., unauthorized transactions). The smart reconciliation computing platform 110 may also flag errors when it detects these additional transactions.

In some embodiments, the data transfer source system 120 may transfer similar data files each day. The smart reconciliation computing platform 110 may create a data file profile for the data transfer source system 120 that tracks the similar data files. For example, the data file profile may include previous data files from the data transfer source system 120. The smart reconciliation computing platform 110 may compare the current data file with the data file profile for the data transfer source system 120 to determine missing and/or additional parts and/or transactions for the current data file. After detecting the missing and/or additional parts and/or transactions, the smart reconciliation computing platform 110 may flag a content level error.

At step 212, the smart reconciliation computing platform 110 may generate one or more commands based on the content level error. For example, the smart reconciliation computing platform 110 may generate, based on the content level error, one or more commands directing a computing device (e.g., the data transfer source system 120, the data transfer destination system 140, and/or the smart reconciliation gateway 130) to execute an automated reconciliation response for the content level error. In some instances, the automated reconciliation response for the content level error may direct the data transfer source system 120 to transmit and/or re-transmit the data file to the data transfer destination system 140. For instance, the data transfer source system 120 may have transmitted the data file with one or more content level errors as described above. The smart reconciliation computing platform 110 may generate one or more commands directing the data transfer source system 120 to transmit the data file to the data transfer destination system 140 without the one or more content level errors.

In some examples, based on the automated reconciliation response for the content level error, the smart reconciliation computing platform 110 may insert missing transactions and/or parts of the data file into the current data file. For example, the smart reconciliation computing platform 110 may use the data file profile to determine any missing transactions and/or parts of the current data file. Afterwards, the smart reconciliation computing platform 110 may determine the content associated with the missing transactions and/or parts of the current data file. Then, the smart reconciliation computing platform 110 may insert the missing transactions and/or parts of the current data file into the current data file. In some embodiments, the automated reconciliation response for the content level error may be to remove additional transactions and/or parts of the data file from the current data file. For example, the smart reconciliation computing platform 110 may determine an unauthorized transaction based on comparing the data file profile with the current data file. After determining the authorized transaction, the smart reconciliation computing platform 110 may remove the unauthorized transaction from the data file.

In some embodiments, based on the automated reconciliation response for the content level error, the smart reconciliation computing platform 110 may direct the smart reconciliation gateway 130 to release portions of the current data file to the data transfer destination system 140. For example, the smart reconciliation computing platform 110 may assign priorities to the different transactions and/or parts of the data file. The priorities, as described above, may indicate priorities of different transactions and/or parts of the data file. Additionally, the priorities may include data file classifications (e.g., confidential, public, and/or private information). Based on the assigned priorities, the smart reconciliation computing platform 110 may direct the smart reconciliation gateway 130 and/or the data transfer source system 120 to release the transactions and/or parts of the data file.

In some instances, based on the automated reconciliation response for the content level error, the smart reconciliation computing platform 110 may insert transactions into the current data file from similar interdependent transactions. For example, as mentioned previously, inlay data may correspond with a plurality of interdependent transactions. The smart reconciliation computing platform 110 may determine missing interdependent transactions and may insert these interdependent transactions into the current data file. Additionally, and/or alternatively, the smart reconciliation computing platform 110 may transmit a notification to the administrative device 150 indicating the missing interdependent transactions. In response to the notification, the administrative device 150 may transmit a user indication to insert the missing transactions. The smart reconciliation computing platform 110 may insert the missing transactions in response to receiving the user indication.

Figure 2D:
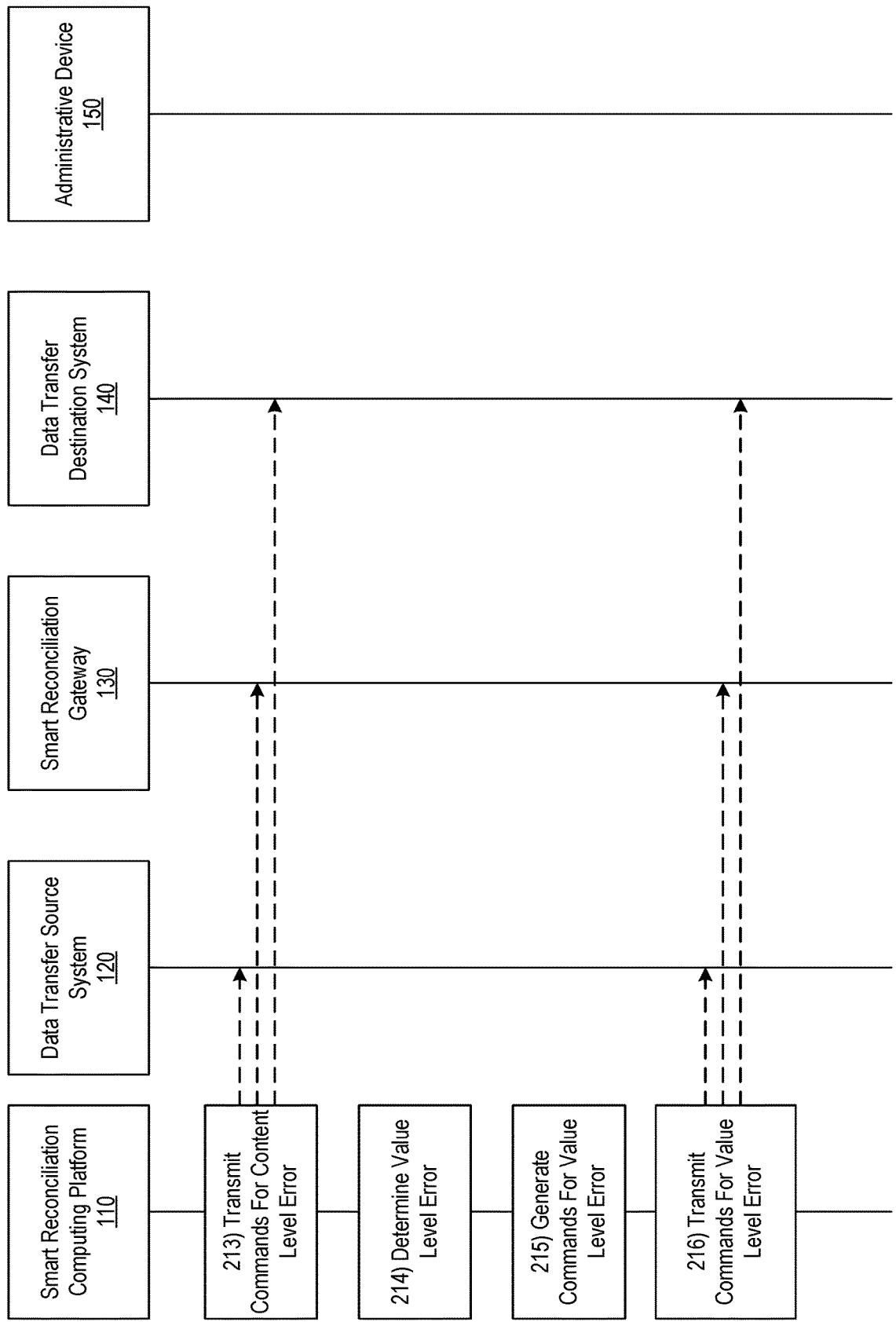

Referring to FIG. 2D, at step 213, the smart reconciliation computing platform 110 may transmit the one or more generated commands based on the content level error. For example, after generating the one or more commands at step 212, the smart reconciliation computing platform 110 may transmit the one or more generated commands to the data transfer source system 120, the data transfer destination system 140, and/or the smart reconciliation gateway 130. In some instances, the data transfer source system 120 may receive and/or execute the one or more commands (e.g., transfer and/or re-transfer the data file to the data transfer destination system 140). In some examples, the smart reconciliation gateway 130 may receive the one or more generated commands. The smart reconciliation gateway 130 may forward the one or more generated commands to the data transfer source system 120 and/or perform the one or more generated commands. For example, in some embodiments, the smart reconciliation gateway 130 may have intercepted the data file at step 202. And, at step 213, based on the one or more generated commands, the smart reconciliation gateway 130 may transmit, forward, and/or perform the one or more generated commands to resolve the content level error.

At step 214, the smart reconciliation computing platform 110 may determine a value level error for the data file. For example, the smart reconciliation computing platform 110 may determine, based on the data file profile characteristics, a level error for the data file. A level error may indicate a delivery level error, a content level error, and/or a value level error. The value level error may indicate an error in one or more values of the data file. In some instances, the smart reconciliation computing platform 110 may determine the data file might not be associated with a delivery level error and/or a content level error. For example, the data transfer source system 120 may transfer a complete data file to the correct data transfer destination system 140. However, the smart reconciliation computing platform 110 may determine a value level error, such as an error in one or more values of the data file. For instance, the smart reconciliation computing platform 110 may compare the data file with the data file profile to determine a value level error. The data file profile may include previous data files associated with the current data file. The smart reconciliation computing platform 110 may determine, from the previous data files, that the current data file contains a value level error.

In some instances, a data file may correspond to a plurality of transactions, and each transaction may be associated with a monetary value. However, the smart reconciliation computing platform 110 may determine that one or more values in the current data file may differ from the previous transactions. For instance, a transaction may indicate "purchasing coffee." Previous transactions may indicate that "purchasing coffee" averages $5. But, the smart reconciliation computing platform 110 may determine that the current data file includes a "purchasing coffee" transaction with a purchase price of $1,000. In such instances, the smart reconciliation computing platform 110 may flag a value level error for the transaction. Additionally, and/or alternatively, the smart reconciliation computing platform 110 may transmit a notification indicating the value level error to the administrative device 150.

In some examples, a data file may contain an incorrect transaction and/or part of the data file. For example, the smart reconciliation computing platform 110 may determine that a data file does not contain a content level error. However, by comparing the data file with the data file profile, the smart reconciliation computing platform 110 may determine that one or more parts and/or transaction may be incorrect and/or may contain one or more incorrect values. The smart reconciliation computing platform 110 may flag a value level error for the transaction and/or part of the data file. Additionally, and/or alternatively, the smart reconciliation computing platform 110 may transmit a notification indicating the value level error to the administrative device 150.

At step 215, the smart reconciliation computing platform 110 may generate one or more commands based on the value level error. For example, the smart reconciliation computing platform 110 may generate, based on the value level error, one or more commands directing a computing device (e.g., the data transfer source system 120, data transfer destination system 140, and/or the smart reconciliation gateway 130) to execute an automated reconciliation response for the value level error. In some examples, the automated reconciliation response for the value level error may be for the data transfer source system 120 to transmit and/or re-transmit the data file to the data transfer destination system 140. For instance, the smart reconciliation computing platform 110 may generate one or more commands directing the data transfer source system 120 to correct the value error determined at step 214, and then re-transmit the data file to the data transfer destination system 140. Additionally, and/or alternatively, the smart reconciliation computing platform 110 may generate one or more commands directing the smart reconciliation gateway 130 to correct the one or more value level errors, and then transmit the intercepted data file to the data transfer destination system 140. Further, additionally, and/or alternatively, the smart reconciliation computing platform 110 may generate one or more commands directing the data transfer destination system 140 to correct the one or more value level errors.

At step 216, the smart reconciliation computing platform 110 may transmit the one or more generated commands based on the value level error. For example, after generating the one or more commands at step 215, the smart reconciliation computing platform 110 may transmit the one or more generated commands to the data transfer source system 120, the data transfer destination system 140, and/or the smart reconciliation gateway 130. In some instances, the data transfer source system 120 may receive and/or execute the one or more commands (e.g., transfer and/or re-transfer the data file to the data transfer destination system 140). Additionally, and/or alternatively, the smart reconciliation gateway 130 may receive the one or more generated commands. In some examples, the smart reconciliation gateway 130 may forward the one or more generated commands to the data transfer source system 120 and/or the data transfer destination system 140. Further, in some embodiments, the smart reconciliation gateway 130 may have intercepted the data file at step 202. And, at step 216, based on the one or more generated commands, the smart reconciliation gateway 130 may transmit or forward the data file to the correct data transfer destination system 140.

Figure 2E:
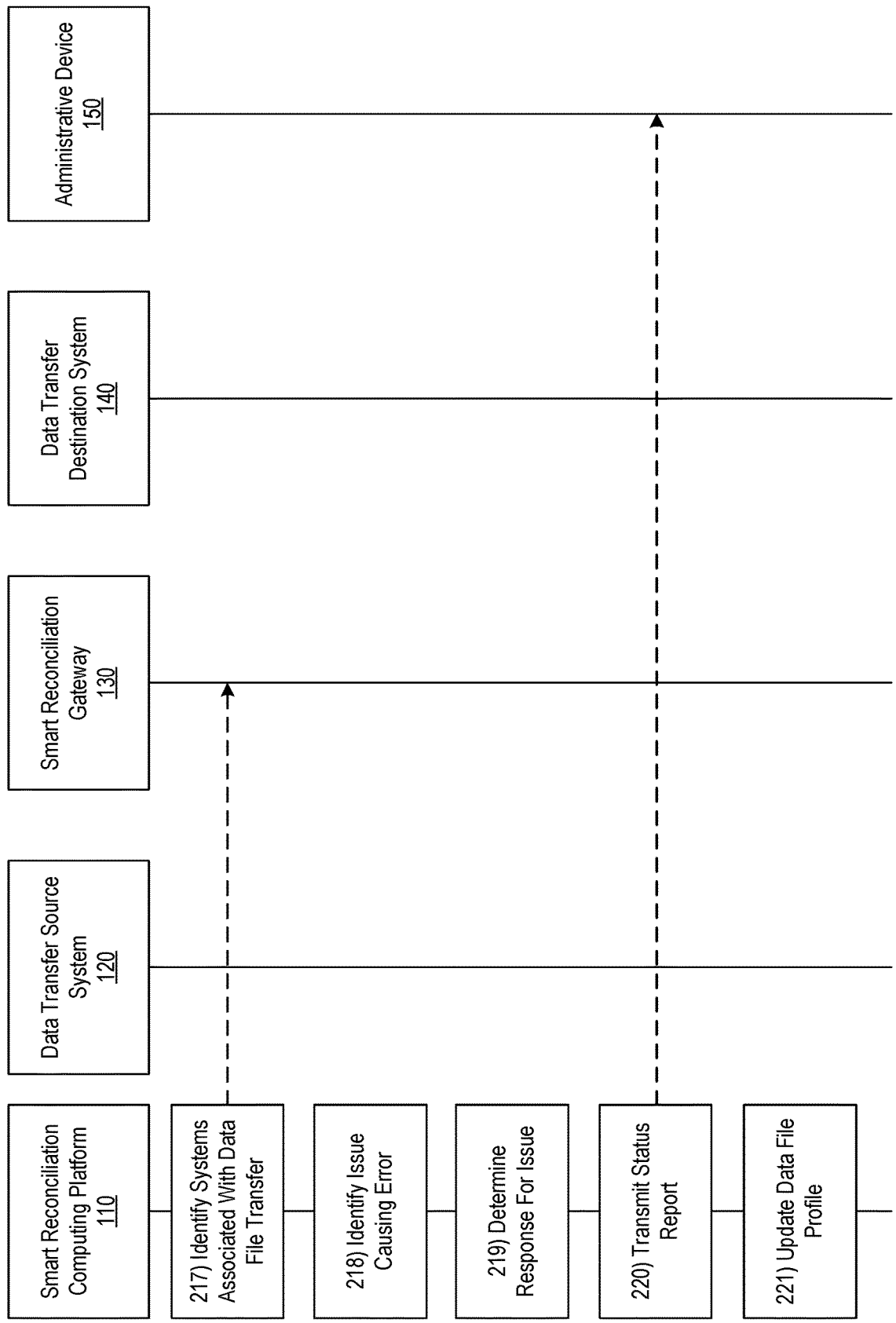

Referring to FIG. 2E, at step 217, the smart reconciliation computing platform 110 may identify systems associated with the data transfer. For example, as mentioned earlier, an enterprise organization may transfer data files between a plurality of different systems. The smart reconciliation computing platform 110, at step 217, may identify the data transfer source system 120 and/or the data transfer destination system 140 associated with the plurality of different systems of the enterprise organization. In some instances, the smart reconciliation computing platform 110 may identify one or more tasks associated with the data file.

At step 218, the smart reconciliation computing platform 110 may identify an issue for causing the error. For example, the smart reconciliation computing platform 110 may determine whether the data file contains a delivery level error, a content level error, and/or value level error. Afterwards, based on the level error and/or the identified systems with the data transfer, the smart reconciliation computing platform 110 may identify the issues and/or reasons causing the error. In some instances, the administrative device 150 may transmit information corresponding to a plurality of known issues associated with the enterprise organization and/or associated with particular systems (e.g., the data transfer source system 120 and/or the data transfer destination system 140). The smart reconciliation computing platform 110 may identify the issue causing the error by comparing the information corresponding to the plurality of known issues.

At step 219, the smart reconciliation computing platform 110 may determine a response for the issue. For example, based on the identified issue at step 218, the smart reconciliation computing platform 110 may determine a response for the issue. The one or more responses may resolve the delivery level error, the content level error, and/or the value level error. After applying the one or more responses and in another iteration of the process, the data transfer source system 120 may transmit a data file to the data transfer destination system without the level errors.

In some examples, the information corresponding to the plurality of known issues may include one or more responses for the issues. The smart reconciliation computing platform 110 may determine the one or more responses and execute the one or more responses. In some embodiments, the smart reconciliation computing platform 110 may generate one or more commands directing the data transfer source system 120, the data transfer destination system 140, and/or the smart reconciliation gateway 130 to execute the one or more responses.

Figure 4:
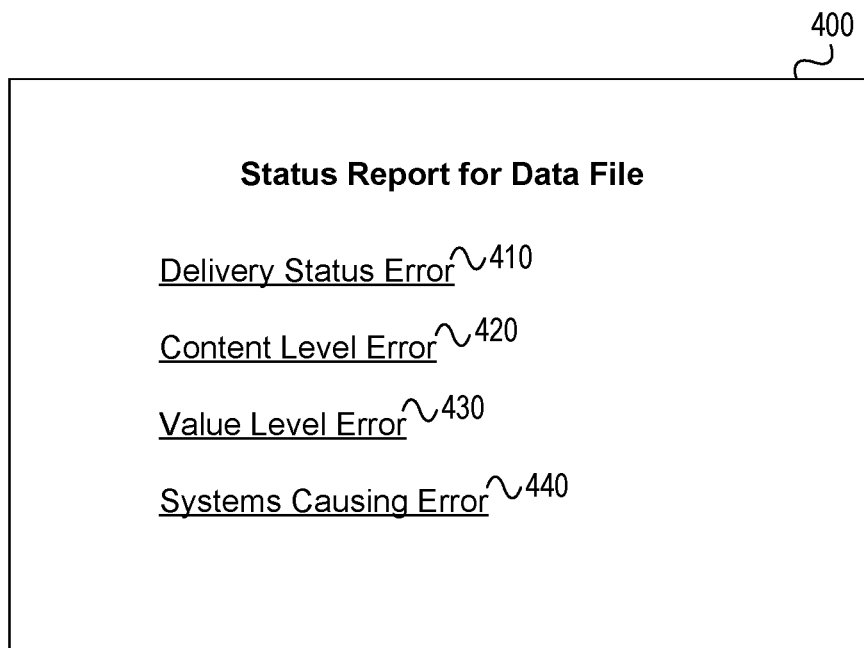

At step 220, the smart reconciliation computing platform 110 may transmit a status report to the administrative device 150. For example, based on the delivery level error, the content level error, and/or the value level error, the smart reconciliation computing platform 110 may generate and transmit a status report to the administrative device 150. In some instances, the smart reconciliation computing platform 110 may generate a status report similar to the status report shown in FIG. 4. As shown in FIG. 4, graphical user interface 400 may include one or more fields, controls, and/or other elements that may allow a user (e.g., an administrator) to view a status report for the data file. For example, the graphical user interface 400 may allow an administrator to use links to view the delivery level error 410, the content level error 420, the value level error 430, and/or the systems causing the errors (e.g., the data transfer source system 120 and/or the data transfer destination system 140). Using graphical user interface 400, the administrator may be able to obtain real-time live updates corresponding to the data file.

At step 220, the smart reconciliation computing platform 110 may update the data file profile. For example, the smart reconciliation computing platform 110 may update, using machine learning engine 125, the data file profile based on the current data file. In some instances, the current data file may include a new pattern of interdependent transactions for the data file profile. For instance, the current data file may indicate a plurality of interdependent transactions that are different than previous data file's interdependent transactions. The smart reconciliation computing platform 110 may flag a content level error based on the difference and may transmit the content level error to the administrative device 150. However, the content level error may be incorrect. After transmitting the status report at step 219, an administrator may determine the current data file's transactions are correct. Then, using administrative device 150, the administrator may transmit a response to update the data file profile based on the current data file.

In some examples, the current data file may be associated with a user account. For instance, the data file profile may indicate previous data files associated with the user account. The user account may indicate fifty transactions per month. But, the user associated with the account may change their transactions based on an event in their lives (e.g., getting married). Hence, the current data file may indicate one hundred transactions per month. The smart reconciliation computing platform 110 may flag a content level error based on the difference and may transmit the content level error to the administrative device 150. However, the content level error may be incorrect. After transmitting the status report at step 219, an administrator may determine the current data file's transactions are correct. Then, using administrative device 150, the administrator may transmit a response to update the data file profile based on the current data file.

In some embodiments, the smart reconciliation computing platform 110 may continuously monitor a plurality of data files for the data file profile. After receiving each data file, including the data files containing one or more level errors, the smart reconciliation computing platform 110 may use the machine learning engine 115 to set, define, and/or iteratively redefine optimization rules, techniques and/or other parameters used by smart reconciliation computing platform 110 and/or other systems in computing environment 100 to update the data file profile.

Figure 5:
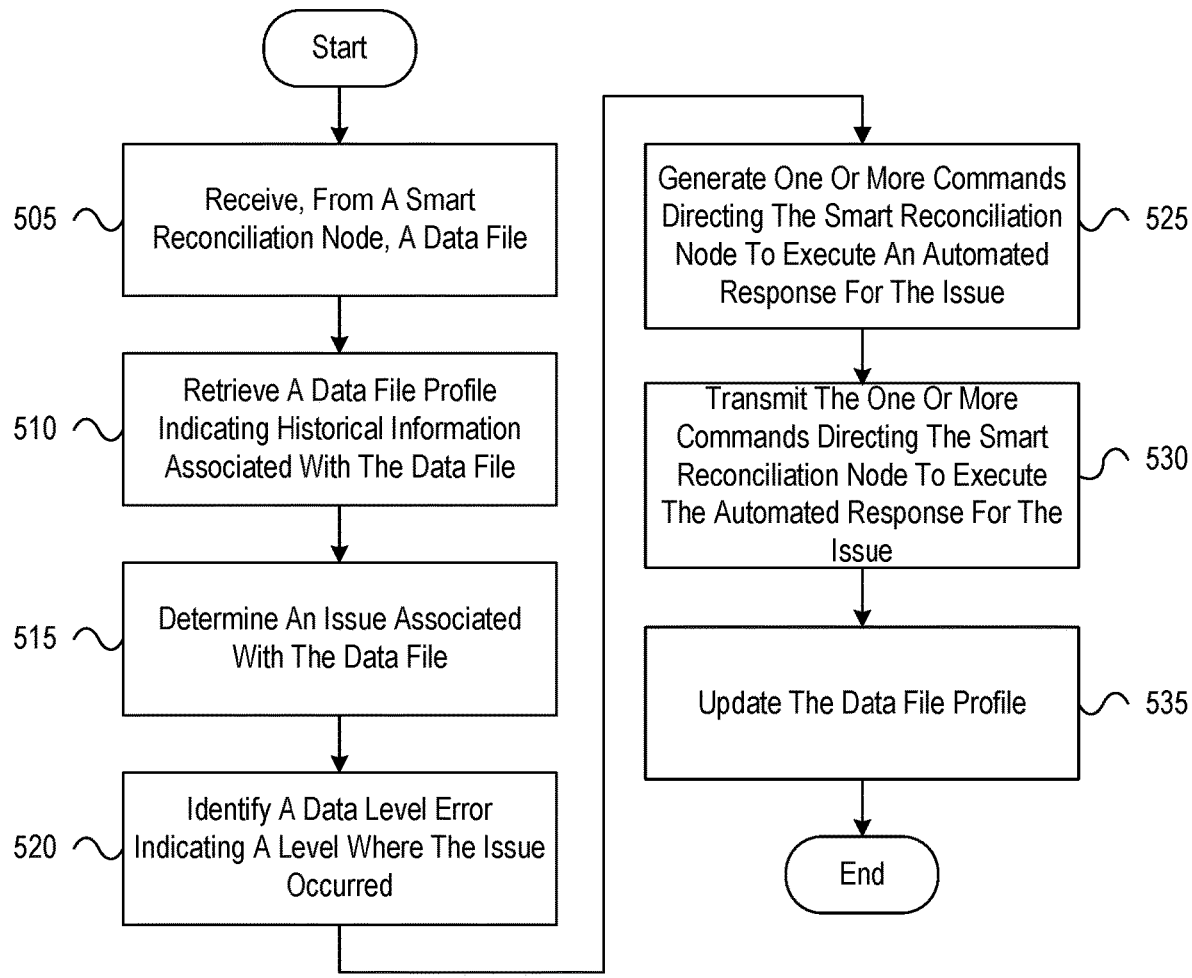
FIG. 5 depicts an illustrative method for transferring data using a smart reconciliation system in accordance with one or more example embodiments.

FIG. 5 depicts an illustrative method for transferring data using a smart reconciliation system in accordance with one or more example embodiments. Referring to FIG. 5, at step 505, a computing platform having at least one processor, a memory, and a communication interface may receive, by the at least one processor, via the communication interface, and from a smart reconciliation node, a data file. At step 510, the computing platform may retrieve, based on the data file, a data file profile indicating historical information associated with the data file. At step 515, the computing platform may determine, based on comparing the data file profile with the data file, an issue associated with the data file. At step 520, the computing platform may identify, based on the issue associated with the data file, a data file level error indicating a level where the issue occurred. At step 525, the computing platform may generate, based on the data file level error, one or more commands directing the smart reconciliation node to execute an automated response for the issue associated with the data file. At step 530, the computing platform may transmit, to the smart reconciliation node via the communication interface, the one or more commands directing the smart reconciliation node to execute the automated response for the issue associated with the data file. At step 535, the computing platform may update, based on the automated response for the issue and the data file, the data file profile.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and memory storing computer-readable instructions that, when executed by the at least one processor, cause the computing platform to:

receive, by the at least one processor, via the communication interface, and from a smart reconciliation node, a data file;

retrieve, based on the data file, a data file profile indicating historical information associated with the data file;

identify, based on the data file, a plurality of sections within the data file;

determine, based on comparing the data file profile with the data file, an issue associated with the data file, wherein determining the issue associated with the data file comprises determining, based on comparing the data file profile with the plurality of sections within the data file, a missing section of the data file, and wherein determining the issue associated with the data file comprises determining an error in delivering a second data file;

identify, based on the issue associated with the data file, a data file level error indicating a level where the issue occurred, wherein identifying the data file level error comprises identifying a content level error, and wherein identifying the data file level error comprises identifying a delivery level error;

generate, based on the data file level error, one or more commands directing the smart reconciliation node to execute an automated response for the issue associated with the data file;

transmit, to the smart reconciliation node via the communication interface, the one or more commands directing the smart reconciliation node to execute the automated response for the issue associated with the data file, wherein transmitting the one or more commands directing the smart reconciliation node to execute the automated response for the issue associated with the data file comprises:

causing, based on the content level error, a first system to deliver content associated with the missing section of the data file to a second system; and causing, based on the data file level error, the first system to redeliver the second data file to the second system; and update, based on the automated response for the issue and the data file, the data file profile.

2. The computing platform of claim 1, wherein the memory stores additional computer-readable instructions that, when executed by the at least one processor, cause the computing platform to:

identify, based on the data file, a route associated with the data file, wherein the route indicates the first system and the second system, and wherein the first system transmits the data file and the second system receives the data file.

3. The computing platform of claim 2, wherein the smart reconciliation node intercepts the data file in transit from the first system to the second system.

4. The computing platform of claim 1, wherein the historical information associated with the data file comprises previous times of day that the data file was received, a number of parts associated with the data file, or one or more priorities associated with the data file.

5. The computing platform of claim 1, wherein the memory stores additional computer-readable instructions that, when executed by the at least one processor, cause the computing platform to:

determine, based on the data file profile and the missing section of the data file, content associated with the missing section of the data file, wherein generating the one or more commands directing the smart reconciliation node to execute the automated response for the issue associated with the data file comprises inserting the content associated with the missing section of the data file in the data file.

6. The computing platform of claim 1, wherein determining the issue associated with the data file comprises determining an error in a value of the data file based on comparing the historical information associated with the data file with the data file, and wherein identifying the data file level error comprises identifying a value level error.

7. The computing platform of claim 6, wherein transmitting the one or more commands directing the smart reconciliation node to execute the automated response for the issue associated with the data file comprises:

replacing the value of the data file associated with the value level error with a corrected value.

8. A method, comprising:

at a computing platform comprising at least one processor, a communication interface, and memory:

receiving, by the at least one processor, via the communication interface, and from a smart reconciliation node, a data file;

retrieving, by the at least one processor, based on the data file, a data file profile indicating historical information associated with the data file;

identifying, by the at least one processor, based on the data file, a plurality of sections within the data file;

determining, by the at least one processor, based on comparing the data file profile with the data file, an issue associated with the data file, wherein determining the issue associated with the data file comprises determining, based on comparing the data file profile with the plurality of sections within the data file, a missing section of the data file, and wherein determining the issue associated with the data file comprises determining an error in delivering a second data file;

identifying, by the at least one processor, based on the issue associated with the data file, a data file level error indicating a level where the issue occurred, wherein identifying the data file level error comprises identifying a content level error, and wherein identifying the data file level error comprises identifying a delivery level error;

generating, by the at least one processor, based on the data file level error, one or more commands directing the smart reconciliation node to execute an automated response for the issue associated with the data file;

transmitting, by the at least one processor, to the smart reconciliation node via the communication interface, the one or more commands directing the smart reconciliation node to execute the automated response for the issue associated with the data file, wherein transmitting the one or more commands directing the smart reconciliation node to execute the automated response for the issue associated with the data file comprises:

causing, based on the content level error, a first system to deliver content associated with the missing section of the data file to a second system; and causing, based on the data file level error, the first system to redeliver the second data file to the second system; and updating, by the at least one processor, based on the automated response for the issue and the data file, the data file profile.

9. The method of claim 8, comprising:

identifying, by the at least one processor, based on the data file, a route associated with the data file, wherein the route indicates the first system and the second system, and wherein the first system transmits the data file and the second system receives the data file.

10. The method of claim 9, wherein the smart reconciliation node intercepts the data file in transit from the first system to the second system.

11. The method of claim 8, wherein the historical information associated with the data file comprises previous times of day that the data file was received, a number of parts associated with the data file, or one or more priorities associated with the data file.

12. The method of claim 8, comprising:

determining, by the at least one processor, based on the data file profile and the missing section of the data file, content associated with the missing section of the data file, wherein generating the one or more commands directing the smart reconciliation node to execute the automated response for the issue associated with the data file comprises inserting the content associated with the missing section of the data file in the data file.

13. The method of claim 8, wherein determining the issue associated with the data file comprises determining an error in a value of the data file based on comparing the historical information associated with the data file with the data file, and wherein identifying the data file level error comprises identifying a value level error.

14. The method of claim 13, wherein transmitting the one or more commands directing the smart reconciliation node to execute the automated response for the issue associated with the data file comprises:

replacing the value of the data file associated with the value level error with a corrected value.

15. One or more non-transitory computer-readable media storing instructions that, when executed by a computing platform comprising at least one processor, a communication interface, and memory, cause the computing platform to:

receive, by the at least one processor, via the communication interface, and from a smart reconciliation node, a data file;

retrieve, based on the data file, a data file profile indicating historical information associated with the data file;

identify, based on the data file, a plurality of sections within the data file;

determine, based on comparing the data file profile with the data file, an issue associated with the data file, wherein determining the issue associated with the data file comprises determining, based on comparing the data file profile with the plurality of sections within the data file, a missing section of the data file, and wherein determining the issue associated with the data file comprises determining an error in delivering a second data file;

identify, based on the issue associated with the data file, a data file level error indicating a level where the issue occurred, wherein identifying the data file level error comprises identifying a content level error, and wherein identifying the data file level error comprises identifying a delivery level error;

generate, based on the data file level error, one or more commands directing the smart reconciliation node to execute an automated response for the issue associated with the data file;

transmit, to the smart reconciliation node via the communication interface, the one or more commands directing the smart reconciliation node to execute the automated response for the issue associated with the data file, wherein transmitting the one or more commands directing the smart reconciliation node to execute the automated response for the issue associated with the data file comprises:

causing, based on the content level error, a first system to deliver content associated with the missing section of the data file to a second system; and causing, based on the data file level error, the first system to redeliver the second data file to the second system; and update, based on the automated response for the issue and the data file, the data file profile.

16. The one or more non-transitory computer-readable media of claim 15, storing additional instructions that, when executed by the computing platform, cause the computing platform to:

identify, based on the data file, a route associated with the data file, wherein the route indicates the first system and the second system, and wherein the first system transmits the data file and the second system receives the data file.

17. The one or more non-transitory computer-readable media of claim 16, wherein the smart reconciliation node intercepts the data file in transit from the first system to the second system.

18. The one or more non-transitory computer-readable media of claim 15, wherein the historical information associated with the data file comprises previous times of day that the data file was received, a number of parts associated with the data file, or one or more priorities associated with the data file.

19. The one or more non-transitory computer-readable media of claim 15, storing additional instructions that, when executed by the computing platform, cause the computing platform to:

determine, based on the data file profile and the missing section of the data file, content associated with the missing section of the data file, wherein generating the one or more commands directing the smart reconciliation node to execute the automated response for the issue associated with the data file comprises inserting the content associated with the missing section of the data file in the data file.

20. The one or more non-transitory computer-readable media of claim 15, wherein determining the issue associated with the data file comprises determining an error in a value of the data file based on comparing the historical information associated with the data file with the data file, and wherein identifying the data file level error comprises identifying a value level error.

\* \* \* \* \*